United States Patent

[11] 3,594,795

[72] Inventors Robert C. Thor
Liverpool;
Earl R. Wingrove, Jr., Clay, both of, N.Y.
[21] Appl. No. 834,566
[22] Filed Dec. 23, 1968
Division of Ser. No. 706,048, Dec. 30, 1967
[45] Patented July 20, 1971
[73] Assignee General Electric Company

[54] RADAR SYSTEM
3 Claims, 11 Drawing Figs.

[52] U.S. Cl. .................................................... 343/17.2
PC, 333/70 T, 343/14
[51] Int. Cl. ...................................................... G01s 9/233
[50] Field of Search ............................................ 343/17.2
PC, 17.2, 14; 333/70 T

[56] References Cited
UNITED STATES PATENTS
2,897,442 7/1959 Wright et al. .................. 333/70 T
2,913,717 11/1959 Brandon et al. ............... 343/17.2 X
3,380,054 4/1968 Cook et al. .................... 343/17.2 PC
3,400,396 9/1968 Cook et al ..................... 343/17.2 PC X Primary Examiner—Malcolm F Hubler
Attorneys—Richard V. Lang, Oscar B. Waddell, Frank L. Neuhauser, Francis E. Blake and Marvin A. Goldenberg ABSTRACT: The present invention deals with a multiple stage pulse modifying filter having a time delay characteristic which is a function of frequency over a prescribed band of frequencies and a radar system which incorporates this filter. The filter has a double input and a single output, the respective paths between the respective inputs and said output having a reciprocal transfer characteristic over a prescribed band of frequencies. During transmission the filter is used to expand a short duration pulse applied to one input terminal and the expanded pulse is coupled from the output terminal of the filter to a transmitter for transmission. The echo of the transmitted pulse is then applied to the second input terminal of the filter for compression of the received echo pulse. The shortened echo pulse is then compared with the initial short duration pulse to obtain range information. Each stage of the bandpass filter save for the first consists of a time delay element connected in series with a band-pass filter, the first stage having a band-pass filter, with each subsequent stage being coupled between the input and output terminals of the band-pass filter of the preceding stage.

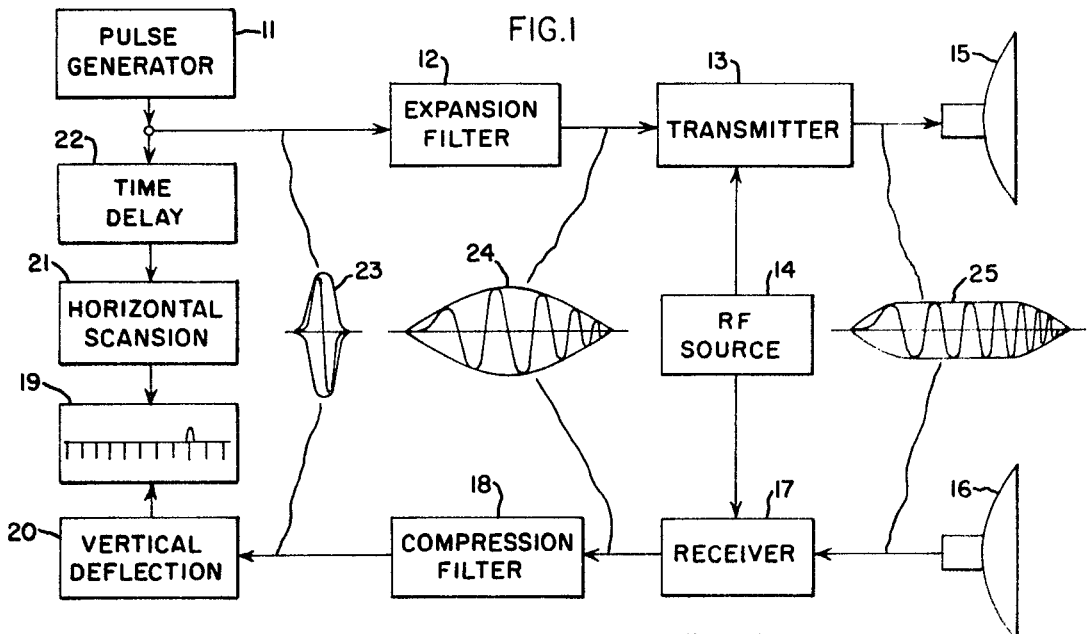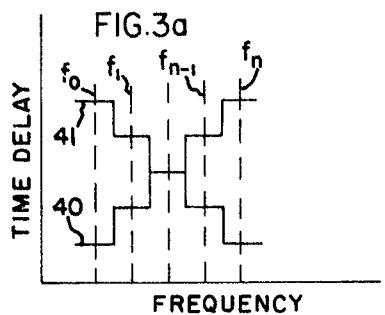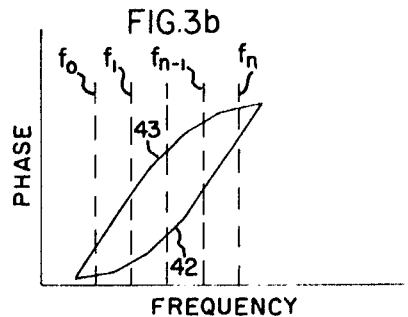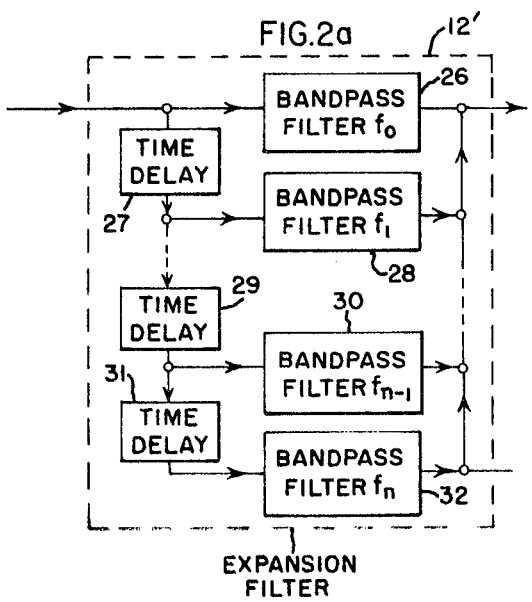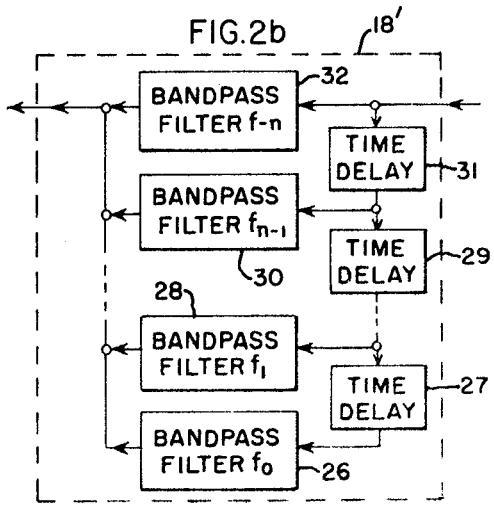

INVENTORS:
ROBERT C. THOR,
EARL R. WINGROVE, JR.
BY *Richard V. Lang*
THEIR ATTORNEY

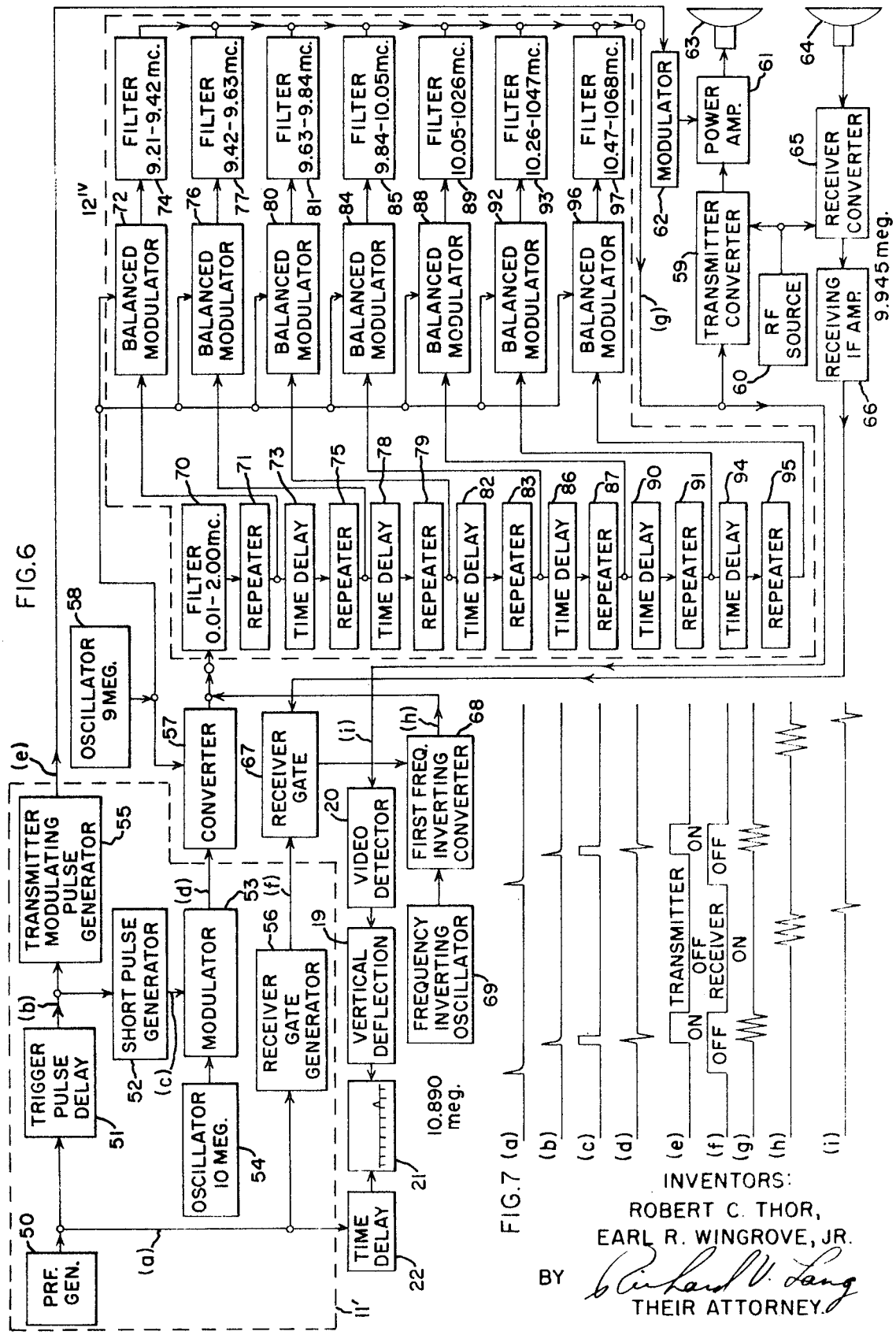

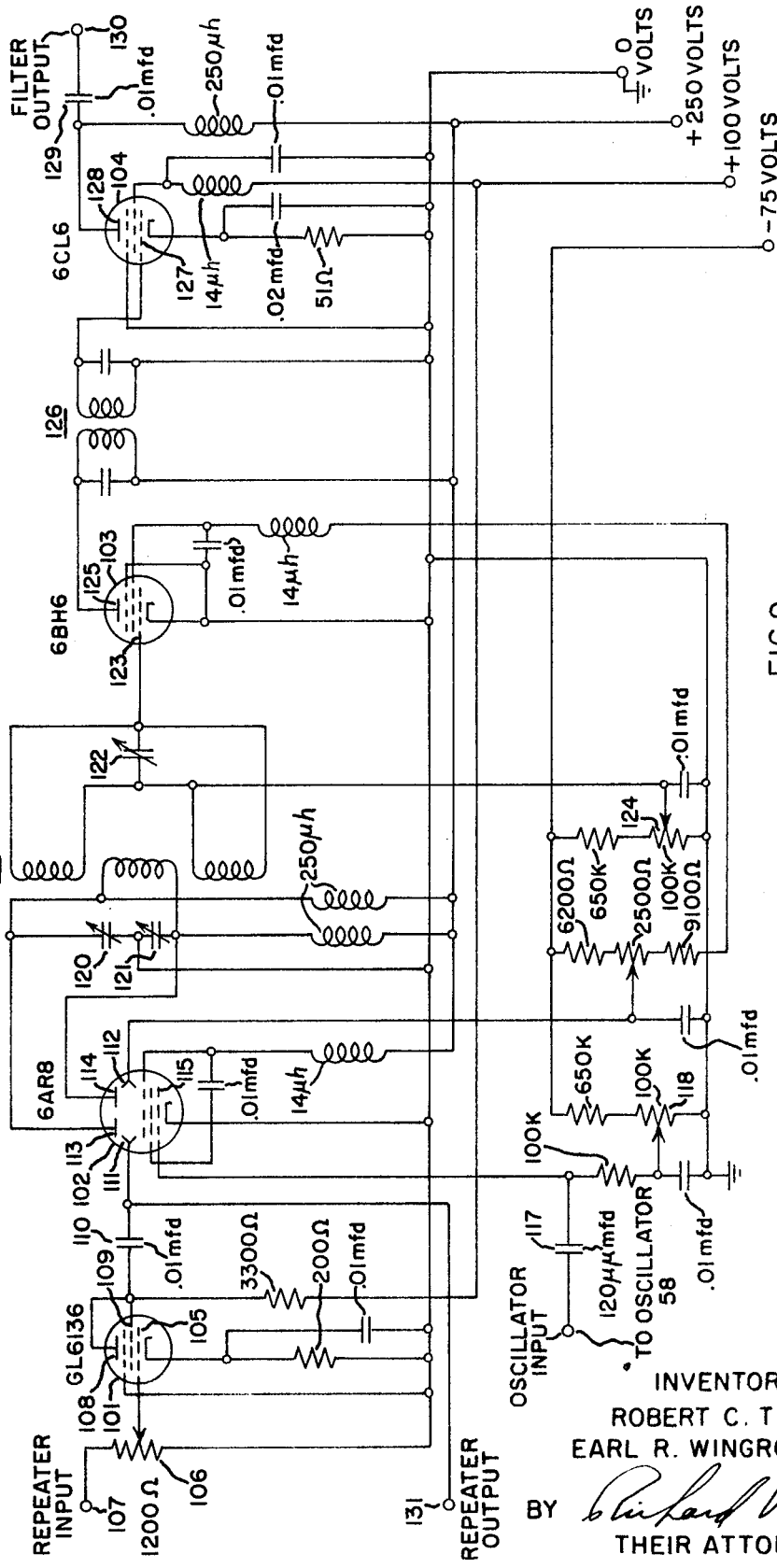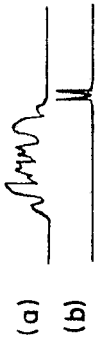

RADAR SYSTEM

The present application is a division of U.S. application Ser. No. 706,048, filed Dec. 30, 1957.

The present invention relates to range determination systems employing radio waves and generally denominated radar systems. More particularly, the invention relates to those types of radar systems employing a power amplifier as the output stage of the radar transmitter.

Radar systems generally employ a transmitter adapted to transmit a wave having some periodic modulation and a receiver adapted to receive echoes of the transmitted wave. The modulation of the transmission gives identity to the transmitted wave, and permits one to determine the amount of time required for passage of the identified portion of the wave from the transmitter to the object causing the echo and back. From a measurement of the time for passage of the wave, one may compute the distance of the object from the transmitter. In such systems, it has been customary too use a pulse type of amplitude modulation to identify portions of the wave. In the event that two objects are closely spaced, the returns may blend into a single pulse, since the amplitudes of the returns may be alike, and prevent separate recognition. If closely spaced objects are to be separately detected in such a system, the duration of the pulse should be shortened to the point where the echo returns produce discrete pulses. In achieving high range resolution short duration pulses have usually been thought necessary.

The requirements for high range resolution conflict with the achievement of long range. This is true because in shortening the transmitted pulse for increased range resolution, the signal processing circuits are required to be of greater bandwidth, thus admitting more background noise and reducing the signal to noise ratio of the system. Thus, increasing the instantaneous power in the transmitter proportionate to the decrease in pulse duration does not increase the range of the system but merely restores the range of the system to its original value since the range of the system is a function of average radiated power.

The search for high instantaneous powers led to the magnetron devices. The magnetron met the need for high instantaneous powers, but was never cured of its inherent frequency instability. In many early applications, this defect was not serious. At the present time, however, there is a growing demand for stable systems in which phase and frequency relations are preserved.

The requirement for a stable high-power transmitter has finally led to the use of high-power amplifiers as the output devices of radar transmitters, amplifying waves derived from high stability sources. The most notable of the power amplifiers is the klystron type of high frequency tube. The klystron, as well as others of these devices, is not so readily suited for high instantaneous power as the magnetron. In general, klystrons have been larger, heavier, and costlier than corresponding magnetrons of equivalent instantaneous power levels. The klystrons do have high average power levels, and though lacking the ability to strike high instantaneous power levels, can operate for long duty cycles at their rated power levels. Operating these amplifier devices for long duty cycles has previously been achieved only at a great loss in range resolution. It is an object of applicant's invention to provide a method of operating a radar transmitter on a longer duty cycle in transmission of a long duration pulse without causing a corresponding loss in range resolution.

It is an object of the applicant's invention to provide a method of operating a radar transmitter on a longer duty cycle in transmission of a long duration pulse without causing a corresponding loss in range resolution.

It is another object of the present invention to provide a new and improved radar system having a transmitter whose output stage is a power amplifier.

It is an additional object of the present invention to provide a novel radar system of increased range having a transmitter whose output stage is a power amplifier.

It is still another object of the present invention to provide a novel filter for creating a controlled expansion of a short duration radiofrequency pulse without loss in coherency of the pulse carrier waves.

It is a further object of the present invention to provide a novel filter for creating a controlled compression of a radiofrequency pulse expanded as a predetermined function of frequency.

It is another object of the present invention to provide a three-terminal filter which between a first pair of terminals creates a controlled expansion of a short duration radiofrequency pulse, and between a second pair of terminals creates a controlled compression of the expanded pulse proportional to restore the pulse to its original shape, the process occurring without loss in coherency of the pulse carrier waves.

It is a further object of the present invention to provide a novel radar system in which a short pulse is transmitted in expanded condition and the echo pulse is compressed prior to use in range determination wherein a common filter is employed for pulse expansion and pulse compression.

These and other objects of the present invention are attained in a novel radar system wherein a short duration radiofrequency pulse of high stability is generated, expanded in a specified manner, transmitted in expanded condition, received as an echo from a reflective object, compressed in a specified manner, and then compared in compressed condition to the initial short duration pulse. Expansion of the pulse is achieved in a filter having a transfer characteristic whose phase response is a nonlinear function of frequency, thus dispersing in time the components into which the short duration pulses may be resolved. Compression of the expanded wave is accomplished in the same or a second filter having a transfer characteristic which is effectively inverse to that of the transfer characteristic of the initial filter. The same filter may be used for expansion and compression if the expanded pulse is inverted in frequency about its mean frequency, prior to reapplication to the filter, and provided the time delay characteristic of the filter is a function of frequency of odd order, symmetric about the center frequency of the filter passband. By reason of the close correspondence between expansion and compression, the pulse carrier waves are retained in coherent condition, preserving the initial phase and frequency information.

In accordance with a further aspect of the invention, a filter having two input terminals and a single output terminal is employed, the transfer characteristic between one input terminal and the output terminal being inverse to the transfer characteristic between the other input terminal and the output terminal.

In accordance with another aspect of the invention, a multiple stage filter suitable for pulse expansion is provided having particular application to systems wherein extremely short duration pulses are required. The filter is constructed of a series of band-pass filters having adjacent consecutive passbands. The band-pass filters are arranged in parallel with their input terminals being coupled at consecutive taps on a time delay element and their output terminals coupled together. In accordance with a further aspect of the invention, frequency conversion is introduced into the multiple stage filter to permit the time delay elements to operate at more convenient low frequencies (below several megacycles) and to permit the band-pass filters to operate at higher frequencies which are more convenient for achieving prescribed higher bandwidths.

The features of the invention which are believed to be novel are set forth with particularlity in the appended claims. The invention itself, however, both as to its organization and method of operation, together with further objects and advantages thereof, may best be understood by reference to the following description when taken in connection with the drawings, wherein:

FIG. 1 is a simplified block diagram illustrating a first embodiment of the invention wherein a radar system is shown having separate expansion and compression filters;

FIGS. 2a and 2b respectively, illustrate specific forms which the expansion filter and compression filter shown in FIG. 1 may take;

FIGS. 3a and 3b illustrate the properties of the filters shown in FIGS. 2a and 2b;

Figure 4:
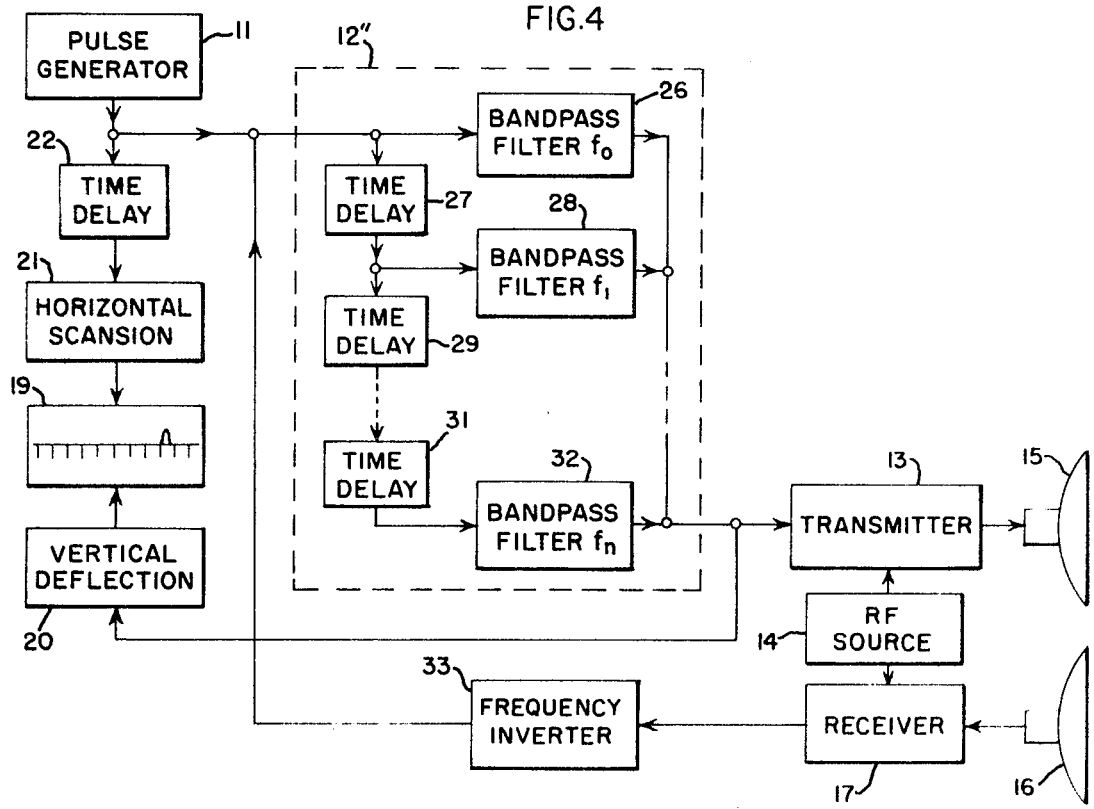
FIG. 4 is a simplified block diagram illustrating a radar system embodying the invention wherein a single filter is used for expansion and compression and wherein inverse transfer properties are achieved by frequency inversion of the expanded pulse prior to compression.
Figure 5:
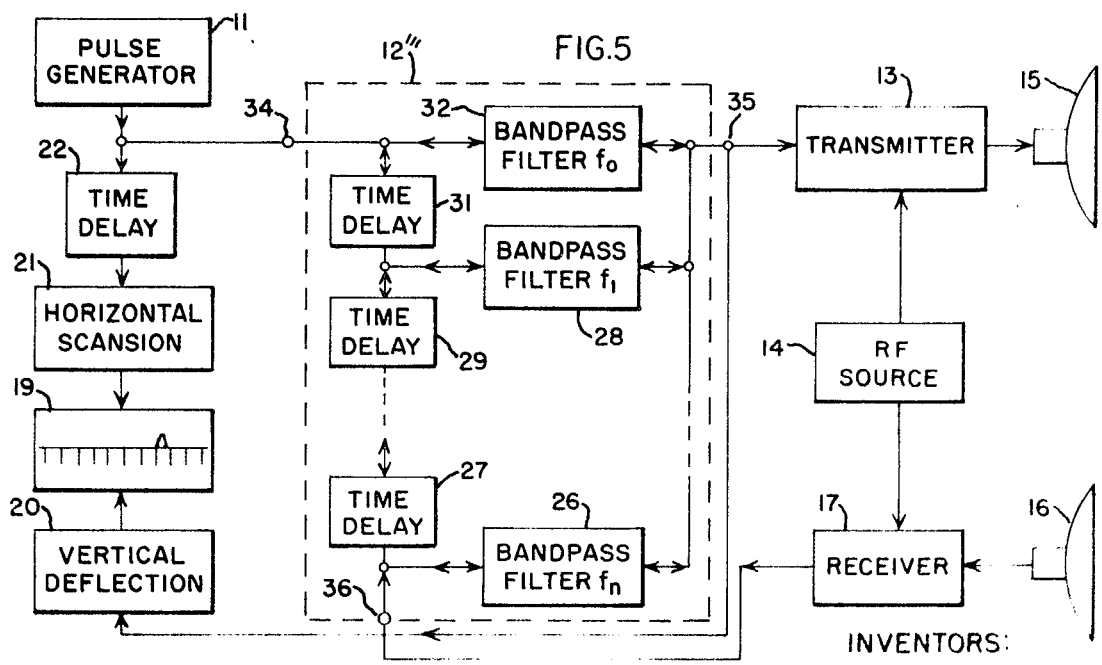

FIG. 5 is a simplified block diagram illustrating another embodiment of the invention wherein a single filter of the multiple path type is employed for expansion and compression, the filter having two input terminals and a single output terminal, the transfer properties between one input terminal and the output terminal being inverse to the transfer properties between the other input terminal and output terminal;

FIG. 6 is a block diagram illustrating a radar system of the same general nature as that illustrated in FIG. 4 wherein frequency inversion is employed to permit use of a single filter for pulse expansion and compression, but wherein the frequency inversion process is completed within the expansion-compression filter itself;

FIG. 7 is a graph of the waves occurring at different portions of the radar system illustrated in FIG. 6;

FIG. 8 is a schematic circuit diagram of the major portion of one stage of the filter 12$^{te}$ employed in the embodiment shown in FIG. 6 and including particularly a repeater, a balanced modulator, and a filter; and FIG. 9 is a graph illustrating the nature of an echo pulse obtained from two closely spaced targets before and after compression.

A radar system embodying the present invention is illustrated in block diagram in FIG. 1. The transmitting portion of the system comprises a pulse generator 11, a pulse expansion filter 12, a transmitter 13, a radiofrequency source 14, and a transmitting antenna 15. The receiving portion of the radar system includes a receiving antenna 16, a receiver 17, which receiver also utilizes the radiofrequency source 14, and a pulse compression filter 18. One may use only one antenna for transmitting and receiving if appropriate means are provided for duplex operation. The range presentation portion of the system comprises a linear-type cathode-ray oscilloscope 19 having vertical deflection control means 20, and a horizontal scansion means 21. Finally, a time delay element 22 is provided for appropriate range presentation.

The connections and operation of the components of the transmitting portion of applicant's novel radar system may now be described. The pulse generator 11 is a source of high frequency pulses of short duration of the nature generally indicated at 23 in FIG. 1. The pulse 23 should have relatively steep leading and trailing edges and have a duration of a few cycles of the carrier wave (usually more than illustrated at 23 in the drawing). Applicant's system poses very few new limitations upon the selection of the pulse carrier frequency, the pulse duration or the pulse repetition rate. Therefore, it may generally be stated that these parameters are chosen in conventional fashion. The power level of the pulse generator 11 need be only a few milliwatts. For stability, it is usually preferable that the pulse generator be crystal controlled. The pulse generator 11 is coupled to the expansion filter 12 thus supplying to the input of the filter 12 a pulse of the form shown at 23. The expansion filter 12 has a time delay (or phase shift) which is a special function of frequency. The effect of a frequency dependent time delay upon a short duration pulse is to delay certain components of the pulse more than others, thus dispersing the components in time, and producing a frequency modulated pulse of relatively long duration as shown at 24 in passage to the output terminals of the filter. As was true in the previous representation 23, the total number of cycles shown at 24 is less than actually attained. The waves are spread out in the illustration in order of increasing frequency (although the opposite order could also be used) and have a gently peaked envelope. The output terminals of the expansion filter 12 are led to the input terminals of the transmitter 13, thus coupling the long duration pulses 24, expanded therein, to the signal input of the transmitter 13. The transmitter 13, which in the usual case operates at a higher frequency than the pulse carrier, is suitably connected with the source 14 of radiofrequency waves, and contains frequency converting means for elevating the pulse carrier frequency to the desired transmitting frequency. The radiofrequency source is preferably of high stability but as will appear, slow fluctuations in frequency are not usually critical since the receiving system uses the same source in an inverse frequency conversion. The transmitter 13 contains a high-power amplifier output stage which amplifies the pulse, after conversion to the radiating frequency, and applies the amplified pulse to the transmitting antenna 15 for radiation toward the area under examination.

The transmitter parameters are in large measure conventional. The output stage of the transmitter may take the form of a high-power klystron or other high-power amplifier devices suitable for use in the desired output frequency range. The radiofrequency source 14 and the selection of its operating frequency, as was true with respect to the choice of initial pulse frequency, are made in a conventional manner.

It may be observed that in the process of passage through the transmitting portions of applicant's system, the initial low energy pulse of short duration is converted to a pulse of long duration in the filter 12, and then converted to a high-power pulse of long duration in the transmitter. The effect of broadening of the transmitted pulse permits one to greatly increase the average transmitted power with a power amplifier of a limited peak power output, and provides a large increase in the effective range of a radar system so limited.

The connections and nature of the components of the receiving portion of applicant's system may now be described. The receiving antenna is shown at 16 having its output coupled to the input of the microwave receiver 17. The receiver 17 is of the superheterodyne type containing therein a frequency converter which receives its heterodyning wave from the radiofrequency source 14 coupled to the receiver. The receiver 17 thus produces in its output a wave reduced in frequency to the original frequency of the long duration pulses 24 applied to the input of the transmitter 13. The received pulses prior to application to the compression filter 18 are of the same general nature as the pulses shown at 24 but are delayed in time with respect thereto. The receiver 17 may be of conventional form. It may have a crystal mixer at its input followed by an intermediate frequency amplifier of high gain. The compression filter 18, which is coupled to the output of the receiver 17, has a transfer characteristic which is the inverse of that of the expansion filter 12. The higher frequency components which were delayed most in producing the expanded pulse in the filter 12, are delayed less in the filter 18, and those which were delayed least in producing the expanded pulse in filter 12, are delayed more in the filter 18. Thus it is seen that the effect of the filter 18 on the expanded echo pulse is to cause compression thereof. The compressed echo pulse closely approximates the shape and duration of the original pulse and may likewise be represented as at 23, when the filters are precisely matched. The output of the compression filter 18 is then coupled to the range display portion of the system.

The range display portions of the circuit comprise the elements 19, 20, 21 and 22 which may be of conventional design. The shortened received pulse appearing at the output of the filter 18 is applied to the vertical deflection means 20. The vertical deflection means 20 includes a detector of conventional design for recovering the envelope of the pulse, and is arranged to provide a vertical deflection to the cathode-ray tube 19 in accordance with the detected pulse. Timed horizontal sweeping is achieved by means of the horizontal scansion means 21 also coupled to the cathode-ray tube 19. The horizontal scansion means 21 derives its timing with respect to the pulse generator 11 by connection of the scansion means 21 through the time delay element 22 to the pulse generator 11. The time delay element 22 is provided for achieving more convenient range presentation. In the case of a system having a plurality of ranges, the time delay element may take the form of a delay line having selectable taps. Presentation can of course be of a plan position type.

The expansion filter 12 and compression filter 18 may now be considered in greater detail. As explained above, the respective filters have a time delay which is dependent upon the frequency of the incident wave and the two filters should be properly matched. As a matter of convenience, the time delay should exhibit a progressive increase with frequency or a progressive decrease with frequency. The expansion filter may exhibit either an increasing or decreasing time delay versus frequency characteristic since expansion will occur in either case. The compression filter should then assume the alternate characteristic. When separate expansion and compression filters are employed as in the embodiment shown in FIG. 1, the time delay versus frequency characteristics are selected to achieve substantial reciprocity in the transfer functions of the filters. Mathematically this requirement can be stated as requiring the transmission characteristic of the expansion filter 12 to be:

$$A(w)e^{j\phi(w)} \quad (1)$$

where $A(w)$ is the gain of the transfer function, as a function of frequency (2), and $e^{j\phi(w)}$ is the phase response of the transfer function, as a function of frequency ($w$) of the expansion filter, while the transfer function of the compression filter 18 is $$\frac{1}{A(w)}e^{-j\phi(w)} \quad (2)$$

Upon multiplication together, the two transfer functions reduce to unity, evidencing that upon passage through both filters, an input pulse would be restored to its original condition except for a total time delay (not treated in the mathematical expressions). This requirement of reciprocity in the transfer functions of the filters may also be stated as a requirement that each Fourier component of the initial pulse be delayed in the second filter by a time which is equal to the negative of the delay in the first filter plus a constant assumed large enough to keep the second quantity positive, and that the gain experience by each component in the expansion filter be matched by a reciprocal gain in the compression filter.

Achievement of perfect transfer reciprocity between the filters, assuming linearity in other portions of the transmitting and receiving system, will provide almost perfect duplication between the original pulse and the pulse which has been expanded and compressed by passage through filters 12 and 18. Pulse duplication is desired since it greatly enhances the accuracy of range determination.

The bandwidths of the expansion and compression filters must be increased as the initial pulse duration is decreased. As indicated earlier, a pulse may be represented as a packet of sinusoidal components of various amplitudes, phases and frequencies. The nature and distribution of these components depends upon the shape of the pulse. In general, a steep slope as at the leading or trailing edge of a pulse is resolvable into components of a wide range of frequencies of relatively equal amplitudes. On the other hand, a smoothly curving horizontal portion of a pulse is resolvable into a few low frequency components, with the amplitudes of higher frequency components being greatly attenuated. If the pulse is of short duration (as the pulse 23) then the distribution of components in frequency is wide, there is relatively little emphasis upon the lower frequency components, and the components occur substantially simultaneously. Upon passage through the expansion filter 12, assuming that the filter has a time delay increasing with frequency, the components are no longer bunched in time, but are scattered, the lower frequency components occurring first and the higher frequency components occurring later, thus producing a type of frequency modulated pulse. If proper timing information is not to be lost by pulse expansion, particular care must be taken to ensure the passage through the filter of all components and particularly the higher frequency components derived from the leading and trailing edges of the pulse. This requires that the bandwidth of the expansion filter be increasingly wide as the initial pulse duration is shortened. After reception of the expanded pulse, and application to the compression filter, the components waves are restored to their previous mutual positions in time. Here, also, for accuracy in reconstitution of the original pulse, it is essential that the compression filter have adequate bandwidth to pass all the essential components.

The foregoing discussion has so far not considered the factor of nonlinearity in the transmission or reception system. As a practical matter, it is often desirable to operate the transmitter output stage at such a high level and with such nonlinearity that the expanded pulse 24 is transmitted with a flattened top as shown at 25. It should be apparent that this flattening has caused a readjustment of the Fourier components, and in fact has emphasized the extreme frequency components of the transmitted pulse. In order that the reconstituted short duration pulse 23 not be distorted by these emphasized components, particularly in its leading and trailing edges, it may be desirable that the compression filter provide attenuations for the extreme frequency components proportioned to offset this transmitter nonlinearity.

The filters 12 and 18 in applications permitting small bandwidths may take the form of lumped constant all pass networks such as the bridged T network employing inductive and capacitive elements in single or cascaded sections. In certain applications, somewhat more simple distributed constant filters may be employed utilizing magnetic and dielectric materials having frequency sensitive reactances. When pulses of extremely short duration are employed, requiring relatively high bandwidth expansion and compression filters, or when frequency sensitive gain adjustment is desired, then it is generally preferable to employ multiple parallel path networks.

FIGS. 2a and 2b show multiple parallel path filter networks which may be used respectively as another form of the expansion filter 12 and compression filter 18 of the radar system shown in FIG. 1. These filter networks are capable of handling short duration pulses whose transmission requires a high total filter bandwidth. The expansion filter 12' shown in FIG. 2a comprises an initial band-pass filter 26 having a center frequency $f_0$, coupled between the input and output terminals of the expansion filter 12'. Connected in shunt with the terminals of the band-pass filter 26 is a first series circuit comprising a time delay 27 and a second band-pass filter 28 having a center frequency $f_1$. In the arrangement shown, one terminal of the time delay 27 is coupled to the input terminal of the expansion filter 12'. The filter 12' may consist of "$n$" similar shunt connected series paths where "$n$" may assume a typical value of seven in which each similar path comprises an additional time delay element (such as the element 29) coupled in series with an additional band-pass filter (30), the series circuit so formed being coupled in shunt with the preceding band-pass filter. Finally, a last ($n^{th}$) time delay element 31, is coupled in series with a last ($n^{th}$) band-pass filter 32, the series circuit so formed being connected in shunt with the next to last ($n-1^{th}$) band-pass filter 30 in the manner illustrated in FIG. 2a.

In establishing the parameters for the components shown in filter 12', it is desirable that certain requirements be satisfied. The total effect of all the band-pass filters 26, 28, 30 and 32, etc., should be to provide a continuous passband to all component waves from the lowest to the highest having a uniform gain to all components and a smoothly increasing phase advance. The desired breadth of passband may conveniently be achieved by providing an adequate number of band-pass filters with successively higher adjoining passbands. For constancy in gain in the crossover region, the crossover characteristics of the adjoining passbands should have equal and opposite slopes, and their intersection should occur at the half gain point. The phase shift between adjacent band-pass filters at the crossover point should be such that the components arrive at integral multiples of a cycle, so as to prevent destructive interference which would impair uniformity of gain in the crossover region. The foregoing criteria may be satisfied by making the time delay of each time delay element equal to the reciprocal of the band width of its corresponding band-pass filter, and by making the time delays equal and the bandwidths equal. If all equalities are maintained, then the phase shift inherent in each preceding band-pass filter will be such as to provide the desired in-phase relationship at the crossover point between the waves passing through adjacent filters. Finally, equality in the time delays in filter 12' produces a steplike monotonically increasing function as shown at 40 in FIG. 3a of time delay versus frequency. The filter characteristic when plotted as phase versus frequency, as at 42 in FIG. 3b, shows a smooth segmented plot, approximating a smooth quadratic curve. (This selection of parameters, while illustrated in a system having separate filters, is particularly well suited for use in a system in which a single transmission filter is employed).

If the above equality requirements are not met, the expanded pulse will not have a uniform or smoothly varying amplitude, but will vary rapidly and in fact may have instances when the amplitude is zero. A nonuniform expanded pulse though less convenient can be used in a two-filter system provided the compression filter has the properly matched transfer function, and provided the transmitter does not introduce undue amounts of amplitude limiting.

The compression filter 18' shown in FIG. 2b may be constructed of similar elements to those shown in FIG. 2a, (if transmission losses may be neglected or means provided for compensation of them). Hence, elements in FIG. 2b which correspond to those in FIG. 2a, employ the same reference numerals. The filter 18' comprises an initial band-pass filter 32 having a center frequency $f_n$, coupled between the input and output terminals of the expansion filter 18'. Connected in shunt with the terminals of the band-pass filter 32 is a first series circuit comprising a time delay 31 and a second band-pass filter 30 having a center frequency $f_{n11}$. One terminal of the time delay 31 is coupled to the input terminal of the compression filter 18'. The filter 18' consists of "$n$" similar shunt connected series paths, in which each similar path comprises an additional time delay element coupled in series with an additional band-pass filter, the series circuit so formed being coupled in shunt with the preceding band-pass filter. In this manner, the next to last time delay element 29 is coupled in series with the next to last band-pass filter 28 having a center frequency $f_1$, the series circuit so formed being connected in shunt with the preceding band-pass filter (not shown). Finally, a last time delay element 27 is coupled in series with a last band-pass filter 26, having a center frequency $f_0$, the series circuit so formed being connected in shunt with the next to last band-pass filter 28.

When the filter 18' is properly matched to the filter 12', its time delay versus frequency plot may conveniently be as shown at 41 in FIG. 3a and its phase versus frequency plot may conveniently be as shown at 43 in FIG. 3b. On inspection of FIG. 3a it may be observed that the time delays of the two filters 12' and 18' are equal at points in the spectrum at equal but opposite distances from the center frequency. Inspection of the phase plot of FIG. 3b shows a similar symmetry about the center frequency with respect to the slopes of the phase plot as to points in the spectrum at equal but opposite distances from the center frequency. If desired, however, considerably greater freedom of choice of filter parameters may be exercised, so long as equations (1) and (2) are satisfied. The effect of these requirements was indicated earlier. The solution suggested in FIGS. 3a and 3b wherein the time delay increases or decreases monotonically, as will subsequently appear, in common with several other solutions does permit use of the same filter for both expansion and contraction.

The effect of losses within the filters and their compensation to achieve reciprocity in transmission may now be considered. If the time delay elements illustrated in FIGS. 2a and 2b have relatively low losses, and the band-pass filters have substantially equal losses, then the reciprocal transmission relationship as between the filters 2a and 2b per se will be substantially preserved with all paths assuming equal gains relative to one another. If, however, any of the time delay elements produce appreciable loss, as is usually the case, or if the band-pass filters have somewhat unequal losses, then it is desirable to incorporate in the respective filter paths controllable amplifying means to restore the gain in the respective paths to a desired value. If there is no problem of transmitter nonlinearity, this value may be chosen to approximate unity. As a practical matter, the band-pass requirements of the individual band-pass filters usually dictate the use of amplifying elements to provide the necessary isolation between the respective tuned circuits of the filters. Those amplifying elements may then be provided for appropriate gain control adjustment to offset transmission losses both in the delay elements and in the band-pass filters.

The foregoing gain adjustments for preservation of unity gain in each path, are required in a system having linearity in transmitter operation. If in fact the transmitter is operated nonlinearly, delivering full power for the substantial duration of the pulse, then the requirement of reciprocity between filters must be restated as a requirement of reciprocity between the resultant transmission properties of the expansion filter and transmitter as against the transmission properties of the compression filter and the associated gain elements. Accordingly, if in transmission the center of the pulse is reduced and edges increased to flatten the top of the expanded pulse, then in reception, means should now be provided for increasing the center frequency components of the transmitted pulse spectrum. While this condition can be achieved outside of the filter, it is readily provided in the compression filters themselves, by reducing the gains of the amplifiers in the "end" band-pass filters while increasing the gains of the amplifiers in the "central" band-pass filters. Since it is usually desirable to operate the transmitter at full power, the expansion filter, in a system employing separate filters for expansion and compression, may be adjusted to create a flat topped output prior to application to the transmitter.

The arrangement shown in FIGS. 1 and 2a and 2b contemplate separate expansion and compression filters. Since such filters are expensive, it may be desirable to arrange for employing the same filter for both expansion and compression. One such arrangement is shown in FIG. 4. The arrangement shown in FIG. 4 provides for double use of the filter 12'', but in other respects, largely duplicates the system shown in FIG. 1. In particular the transmitting portion of the radar system comprises a pulse generator 11 having its output coupled to the input of the filter 12''. The output of the filter 12'' is then led to the transmitter 13 whose output is coupled to the transmitting antenna 15. As before, an RF source 14 is provided, coupled to the transmitter 13. The receiving portion of the system comprises a receiving antenna 16 leading to the receiver 17 which is also coupled to the RF source 14. The output of receiver 17, however, is led to a frequency inverter 33, the output of which is coupled to the input connection of the filter 12''. The output of the filter 12'' is then led to the vertical deflection means 20. The display elements 19, 20, 21 and 22 are as illustrated in FIG. 1.

The elements shown in FIG. 4, with the exception of the frequency inverter 33 and means for providing isolated use of the filter 12'' in transmission and reception, may be the same as shown in FIGS. 1 and 2a. The filter 12'' may take the form shown in FIG. 2a. It may have a monotonically increasing or decreasing time delay versus frequency, or more generally, it may have a time delay versus frequency function of odd order symmetry about the center frequency of the filter. If a nonlinear transmitter is employed, the gains of the channels should be adjusted to offset transmitter limiting as explained in connection with filter 18'. The frequency inverter may take the form of a mixing device wherein a signal is twice mixed with locally generated waves. While several equivalent ways of achieving frequency inversion are known, one such way is to mix the pulse at the intermediate frequency initially with a higher than intermediate frequency wave, select the difference wave, mix the difference wave with a lower than intermediate frequency wave, and select the sum wave. If the sum of the two heterodyning waves is equal to twice the center filter or intermediate frequency, then the components of the initial wave will be inverted in frequency about the center intermediate frequency.

Isolation between the receiver and the transmitter, in their joint use of the filter 12", may be accomplished by disconnecting the receiver from the filter both during transmission and sufficiently prior thereto to clear the filter of any receiver noise that might otherwise be transmitted. One such system is illustrated in greater detail in FIG. 6.

From a consideration of FIG. 4 it may be observed that the arrangement there shown functions in a manner similar to the arrangements shown in FIGS. 1, 2a and 2b. During transmission, waves developed in the pulse generator are transmitted in a forward direction from the input terminal to the output terminal of the filter 12" from which they are transmitted by the elements 13 and 15. Upon reception, the components are passed through the antenna 16, the receiver 17 and the frequency inverter 33 to the input of the filter 12" again. Since the frequencies in the received signal are now inverted in order, originally low frequency components which passed through band-pass filter 26 with no time delays now pass through the full chain of time delays and are finally passed through band-pass filter 32. Thus the frequency inversion provides a means for achieving reciprocal characteristics while using a single filter. Since the components receive compensatory delays, the received pulse is recompressed to its original form. It should be observed that inversion of the expanded pulse may occur either before or after transmission.

A second arrangement which permits a single filter to provide both the expansion and compression functions is shown in FIG. 5. The filter 12''' shown in FIG. 5 duplicates the filter 12" shown in FIG. 4 save for the provision of an additional point of connection into the filter. Its characteristics may be as indicated in FIGS. 3a and 3b, but in general, does not require any symmetry about the center filter frequency in the time delay function. The remaining portions of the arrangement shown in FIG. 5 are similar to those shown in FIG. 4, except for the omission of the frequency inverter 33 and a change in timing requirements for isolating transmitter and receiver. In the arrangement shown in FIG. 5, a transmitting input terminal of the filter 12''' is shown at 34 coupled to the pulse generator 11. The transmitting output terminal is shown at 35 coupled to the input of the transmitter 13. A receiving input terminal is shown at 36 coupled to the output of the receiver 17. The output terminal 35 serves also as the output terminal of the receiving system and is coupled to the input of vertical deflection means 20. In the foregoing arrangement, it may thus be seen that the signals in transmission are relatively retarded with advancing frequency in passage from the input terminal 34 to the output terminal 35 of the filter 12'''. In reception, the received pulse components are relatively advanced with advancing frequency in passage from the input terminal 36 to the output terminal 35 of the filter 12'''. Thus, the pulse is reconstituted since the input terminals 34 and 35 lead to paths having mutually reciprocal transmission characteristics. The effect is analogous to superimposing filters 12' and 18'.

In both arrangements shown in FIGS. 4 and 5 means must be provided to clear the filter of received pulses and noise prior to and during periods of transmission.

A third arrangement which permits the use of a single filter for both the expansion and compression functions is shown in FIG. 6 with explanatory waveshapes illustrated on a common time base in FIG. 7. The arrangement shown in FIG. 6 resembles in principle the arrangement described in connection with FIG. 4. It is different from the arrangement shown in FIG. 4 in that the frequency inversion is provided partly with elements external to the expansion-compression filter, and partly with elements internal to the filter. As it will subsequently appear, this mode of circuitry has the advantage of permitting the use of a more convenient type of time delay element in execution of the filter.

The arrangement shown in FIG. 6 has as its principal components a source of modulated pulses shown in the dotted block outline 11', an expansion-compression filter shown in dotted outline at $12^{iv}$, transmitting components, receiving components, including means for frequency inversion, and visual display means 19, 20, 21 and 22 which are similar to those used in the previously described embodiments.

The pulse generator is shown in dotted outline at 11'. It is the source of short duration pulses of high frequency which are expanded in the filter $12^{iv}$ and ultimately transmitted and contains in addition thereto means for timing the transmitter, the receiver, and the visual display. The pulse generator 11' comprises a pulse repetition frequency generator 50, a trigger pulse delay element 51, a short pulse generator 52, a modulator 53, and an oscillator 54, which elements are used in the generation of the short duration pulses ultimately transmitted.

The pulse repetition frequency generator 50 produces a periodic pulse of short duration of the type shown at a of FIG. 7. In some applications where high stability is desired, the generator 50 may be crystal controlled. This pulse is applied to the trigger pulse delay element 51 which delays the pulse (as shown in FIG. 7 at b) by a time substantially equal to the total time delay in the filter $12^{iv}$ before applying it to the short pulse generator 52. The pulse delay element 51 may take the form of a delay line, or other forms that produce a new pulse a predetermined time after the occurrence of the input pulse. The short pulse generator 52 may take the form of a monostable multivibrator which produces short pulses as shown at c of FIG. 7, having steep sides, flat tops and short durations, whose leading edge is timed in coincidence with the delayed trigger pulses b. The output pulse of the generator 52 is fed to the modulating input of the amplitude modulator 53. The amplitude modulator 53, which is supplied with high frequency waves from the oscillator 54, then produces in its output short duration pulses of the frequency of the oscillator 54 conforming in amplitude to the envelope of the short pulse produced by the short pulse generator 52. The output of the modulator is shown at d in FIG. 7. In practice, the oscillator frequency is selected with respect to the duration of the short pulse generator so that only a few cycles are transmitted during each pulse. To simplify the drawing, only one cycle is represented.

Timing of the transmitter is achieved by means of the transmitter modulating pulse generator 55 which is supplied with delayed trigger pulses from trigger pulse delay element 51 to which it is coupled. The transmitter modulating pulse generator 55 may be a multivibrator which generates a pulse as shown at e in FIG. 7, having a leading edge which coincides with the delayed pulse (b) and whose duration is substantially equal to the total time delay inherent in the filter $12^{iv}$. As will subsequently appear, this pulse is used to control the operation of the transmitter, turning the transmitter on for the pulse duration.

The element 56 of the pulse generator 11' is the receiving gate generator which controls the connection of the receiver output to the filter $12^{iv}$. It is coupled to the output of the pulse repetition frequency generator 50 for synchronization therewith. The receiving gate generator 56 may be a multivibrator which produces at its output a rectangular pulse of the type shown at f in FIG. 7, having a leading edge which is synchronized with the pulse from the generator 50. The duration of the pulse is chosen to be slightly in excess of twice the total time delay achieved in the filter $12^{iv}$. Hence its trailing edge occurs in substantial coincidence with the trailing edge of the transmitter controlling pulse (e). The receiver is disconnected from the filter $12^{iv}$ during the occurrence of the pulse (f). It will be observed that the foregoing timing not only prevents the receiver from being connected to the filter during periods of transmission, but also provides disconnection of the receiver in advance of transmission by a time equal to the time delay inherent in the filter $12^{iv}$.

The last timing output derived from the pulse generator block $11'$ is a timing signal for timing the visual display. Timing of the visual display is achieved by coupling the pulse repetition frequency generator 50 to one terminal of the time delay element 22.

The transmitting components of the arrangement shown in FIG. 1 include a frequency converter 57, an oscillator 58, the filter $12^{iv}$, a second frequency converter 59, a radiofrequency source 60, the power amplifier 61, the modulator 62 and the transmitting antenna 63. The radio frequency pulse developed in the output of the modulator 53 of the pulse generator $11'$ is coupled to one input of the frequency converter 57. In the illustrative example, the pulse is modulated on a carrier of 10 megacycles. Another input of the frequency converter 57 is connected to the oscillator 58 which produces a wave of 9 megacycles. The frequency converter 57 then reduces the frequency of the pulse carrier by the amount of the frequency of the oscillator 58 to a value of approximately 1 megacycle. The 1-megacycle pulse is applied to the input terminal of the filter $12^{iv}$ and after a number of transformations is passed through the filter. The filter, whose execution will be subsequently described, produces the expanded pulse, shown at $g$ in FIG. 7. The expanded pulse appearing at the output of the filter $12^{iv}$ is fed to the transmitter converter 59, which is coupled to the radiofrequency source 60. The frequency of the radiofrequency source 60 is chosen to be high relative to that of the carrier frequency of the pulse as it appears at the output of the filter $12^{iv}$, and accordingly produces a substantial elevation of the pulse frequency in the converter 59. The output of the converter 59 is then applied to the input of the power amplifier 61 and after amplification therein is supplied to the transmitting antenna 63.

Controlled operation of the power amplifier 61 is achieved by means of the modulator 62, and transmitter modulating pulse generator 55. The pulse ($e$) which is produced in the transmitter modulating pulse generator 55 is applied to the input of the modulator 62. The modulator 62 then develops a modulating voltage timed with the pulse ($e$) which is applied to the modulating input of the power amplifier to cause operation of the power amplifier in synchronism with the pulse ($e$). The power amplifier may take the form of a klystron, and its modulator 62 may serve as the source of energization of the klystron. If this method of modulation is employed, the power amplifier 61 will be completely disabled from transmission except for the period when the modulator is turned on. It should be observed that the periods during which the power amplifier 61 is operated are adjusted to permit full passage of the pulse. In some cases the time may be slightly in excess of the period of the expanded pulse ($g$) so that the transmitted pulse will not be clipped at either the beginning or ending of the modulation periods.

The receiving portions of the transmitting system shown in FIG. 6 comprise a receiving antenna 64, a receiver converter 65, which is coupled to the RF source 60, a receiver IF amplifier 66, a receiver gate 67, a first frequency inverting converter 68, a frequency inverting oscillator 69, the previously mentioned oscillator 58, and the filter $12^{iv}$. Signals are received in the receiving antenna 64 and reduced in frequency in the receiver converter by being heterodyned by waves derived from the radiofrequency source 60. The output of the receiver converter 65 is coupled to the receiver IF amplifier 66, whose output is in turn coupled to an input terminal of the receiver gate 67. The IF frequency may take a value of 9.945 megacycles. The control connection of the receiver gate 67 is coupled to the receiver gate generator 56 which is contained in the pulse generator $11'$. As explained above, the receiver gate is turned off during the period of the production of a pulse from the receiver gate generator 11 but is turned on to permit capture of the echoed pulse, which is delayed in time as shown at $h$ in FIG. 7. The gated output of the receiver gate 66 is then fed to the first frequency inverting converter 68. Here, the received pulse is mixed with the output waves of 10.890 megacycles developed by the frequency inverting oscillator 69 coupled to the other input of the converter 68. The converter 68 converts the pulse carrier to the approximately 1-megacycle frequency at which the pulse was initially delivered to the filter $12^{iv}$ during the transmission cycle. The pulse is then passed through the filter $12^{iv}$ for compression and completion of the frequency inversion process. After passage through the filter $12^{iv}$, the compressed pulse is supplied to the indicating means including the elements 19, 20, 21 and 22, which may take the same form as in the previous embodiments.

The expansion compression filter $12^{iv}$ may now be described. The odd order time delay symmetry about the center filter frequency should be preserved as before, and is in fact as illustrated in FIGS. 3a and 3b. The filter $12^{iv}$ has at its input, a filter 70 providing passage to a band of waves lying from between 0.01 and 2.00 megacycles. It thus accommodates pulses having a carrier of approximately 1 megacycle, as for instance the received pulses of 0.945 megacycles and passes them with slightly less than 1 megacycle bandwidth per sideband. The output of the filter 70 is fed through a repeater 71, adjusted to restore the insertion loss of the filter 70, and is applied jointly to the balanced modulator 72 and the time delay element 73. The balanced modulator 72 is simultaneously supplied with a 9-megacycle wave from the oscillator 58 and heterodynes this wave with the pulses supplied from the repeater 71, having a frequency of approximately 1 megacycle (more precisely 0.945 megacycles). Assuming that the sum heterodyne resultant is selected, the center frequency of the heterodyne resultant is 9.945 megacycles with sidebands extending in either direction therefrom. The filter 74 connected between the output of the balanced modulator 72 and the output terminal of the filter $12^{iv}$ couples the portion of the output of the balanced modulator lying between 9.21 and 9.24 megacycles to the output terminal. The filter 74 also contains an amplifier of controllable gain for providing a controlled amount of deemphasis in the event that a limiting type of transmitter is employed, or for adjustment of the compression filter to provide more accurate reproduction of the reconstituted pulse. The modulator 72 is preferably a balanced modulator since it can be balanced so as to avoid feed through of the carrier of the oscillator 58 into the compression filter output.

The first stage of the filter $12^{iv}$ is reproduced in each of the six subsequent stages. The second output of the repeater 71 is fed to a second stage of the filter network $12^{iv}$. The second stage comprises a time delay element 73, a second repeater 75, a balanced modulator 76 and a filter 77. The output of the repeater 71 is fed through the time delay element 73 to a second repeater 75. The time delay element may take the form of a so-called "video delay line" whose outer appearance resembles that of a coaxial line. The time delay element should have a bandwidth substantially capable of passing waves from 0.01 to 2.00 megacycles, as is readily attained in this type of delay line. One delay line is the General Electric helical delay line DL1250. Each delay element provides a delay of 4.75 microseconds. The output of the second repeater 75 is split between the second balanced modulator 76 and the second time delay element 77 which is a component of the third stage. The balanced modulator 76 is coupled to oscillator 58, and feeds the heterodyned output to the filter 77 having a passband of 9.42 to 9.63 megacycles. The output of the filter 77 is coupled as before to the output terminal of the expansion-compression filter $12^{iv}$.

The filter $12^{iv}$ is provided with five similar additional stages, the third stage including a time delay element 78, a repeater 79, a balanced modulator 80, and a band-pass filter 81 tuned to 9.63 to 9.84 megacycles. The fourth stage includes a time delay element 82, a repeater 83, a balanced modulator 84 and finally a filter 85 tuned to pass a band of frequencies lying between 9.84 and 10.05 megacycles. The fifth stage includes a time delay element 86, a repeater 87, a balanced modulator 88 and a filter 89 tuned to pass the band of frequencies lying between 10.05 and 10.26 megacycles. The sixth stage includes a time delay element 90, a repeater 91, a balanced modulator 92, and a band-pass filter 93, tuned to pass a band of frequencies lying between 10.26 and 10.47 megacycles. The seventh and final stage includes a time delay element 94, a repeater 95, a balanced modulator 96 and a final band-pass filter 97 tuned to pass a band of frequencies lying between 10.47 and 10.68 megacycles. Each of the elements in the stages one through seven are interconnected in the same manner as in the first stage, and except for the different frequencies of the band-pass filters and an additional 180° phase shift in the even numbered stages as explained subsequently, the respective components may be of similar design. It may thus be seen that the band-pass filters 74, 77, 81, 85, 89, 93 and 97 provide a path for frequencies lying between 9.21 and 10.68 megacycles. Thus the filter $12^{tr}$ has a center frequency of approximately 9.945 megacycles and a bandwidth extending in either direction from the center frequency by 0.735 megacycles.

The filter $12^{tr}$ completes the frequency inversion initiated by the frequency inverting elements 68 and 69. The modulators 72, 76, 80, 84, 88, 92 and 96, each of which are coupled to the oscillator 58, are each assisted by the filters 74, 77, 81, 85, 89, 93 and 97 respectively in selecting the sum heterodyne component. Thus, the initial conversion in which the difference frequency is derived by beating the pulse with a higher frequency wave combines with the second conversion occurring in the filter $12^{tp}$ in which the sum component is derived by beating the pulse again with a higher frequency wave to complete the inversion of the frequency spectrum. The two heterodyning oscillations of 10.000 and 9.000 megacycles respectively, are equally spaced about the center intermediate frequency of 9.945 megacycles. Thus, the frequency inversion is performed in such a manner as to invert the frequency spectrum about the center filter frequency and permits the filter $12^{tp}$ to exhibit reciprocal transfer functions in both transmitting and receiving as was true in the embodiment shown in FIG. 4.

FIG. 8 illustrates a schematic circuit diagram of one stage of the filter $12^{tp}$, omitting only the delay element which is used in interconnection of the stages. It should be appreciated that this diagram is only illustrative of one form in which the successive stages may be executed. Resistance values and tube types have been indicated on the drawing, but the invention should in no way be construed as limited thereto. The filter stage employs four tubes wherein the first tube 101 is a triode amplifier performing the repeater function, the second tube 102 of the beam deflection type performs the balanced modulation, and two pentode devices numbered respectively 103 and 104 performs the necessary amplification and isolation function in the filter.

The repeater function is provided by a triode amplifier tube 101, whose signal grid 105 is coupled to a tap on a potentiometer 106 whose end terminals are respectively coupled between the repeater input connection 107 and ground for repeater gain control. The repeater amplifier introduces a phase shift of 180° in each of the even numbered stages. This is compensated by reversing the polarity of one of the windings of one of the IF transformers, thus introducing an additional 180° phase shift. The output of the repeater tube 101 is derived from the plate electrode 108, which electrode is joined to the screen electrode 109. The output is then applied through a coupling capacitor 110 jointly to one beam deflection electrode 111 of the beam modulating tube 102 and to the repeater output terminal 131 for connection with a subsequent stage of the filter $12^{tr}$. Energization of the tube 101 is conventional. Its function is to provide controlled amplification of the pulse supplied thereto. It is preferably adjusted to offset the losses in the preceding time delay element.

The beam modulator tube 102 is a tube having two beam deflection electrodes 111, 112, two plates 113, 114, and additional grids serving the customary operating and control functions, including a control grid 115. As indicated above, the beam deflection electrode 111 is coupled to the output of the repeater and thus applies pulses whose frequency content lies between 0.01 and 2.00 megacycles to the balanced modulator tube. The other beam deflection electrode 112 is coupled to a source of adjustable direct potential, including the variable resistance 116, for balancing the distribution of the carrier between the plate electrodes 113 and 114. The signal grid 115 of the balanced modulator tube 102 is coupled through a coupling capacitor 117 to the oscillator 58 providing a wave of 9 megacycles against which the pulse is heterodyned. For adjustment of the gain of the modulator, the grid 115 is also coupled to a source of adjustable direct potential including the variable resistance 118. The radiofrequency waves derived in the plate electrode 113 and 114 are applied to the respective ends of a primary winding of a balanced output transformer 119. Precise tuning of the output circuit of the anodes 113 and 114 is provided by the tuning capacitors 120 and 121, which resonate with the primary of the transformer 119 to form a parallel resonant tank circuit. The balanced transformer 119 contains as a secondary, two balanced windings connected in parallel. The beam modulator is thus adapted to convert the pulse applied to it to a new frequency, in such a way that the carrier wave supplied by the oscillator 58 for the conversion is completely suppressed. Complete suppression is achieved by adjustment of the balancing control 116.

The filter portion of the stage employs the vacuum tubes 103 and 104 and has the benefit of two double tuned circuits. As indicated above, the primary of the transformer 119 is tuned by capacitors 120 and 121. The secondary of the transformer 119 is tuned by capacitor 122 in shunt therewith, and one terminal is applied to the control grid 123 of the amplifying pentode 103. The gain of the pentode 103 is adjustably controlled by connection of the other terminal of the secondary winding to a source of adjustable direct potential, including the variable resistance 124. The output of the pentode 103 appears in the plate electrode 125, and is coupled through the double tuned radiofrequency transformer 126 to the signal grid 127 of the pentode amplifier 104. The amplified signal appears in the plate electrode 128 and is applied through coupling capacitor 125 to the filter output terminal 130. The energization of the devices 103 and 104 is conventional. The above tuned circuit elements are tuned to pass a band of frequencies corresponding to one of the bands illustrated in FIG. 6, and the gain control 124 provides the desired gain to the band transmitted.

The above invention provides increased average radiated power for a radar system in which the maximum power output of the power amplifier is limited. It accomplishes this goal by increasing the duty cycle of the transmitter power amplifier. This goal is accomplished without any loss of ability to discriminate between closely spaced targets. In FIG. 9 the broad echo pulse as it appears under the influence of two closely spaced targets is shown at (a). It may be observed that the composite echo pulse contains peaks and valleys as a result of the superposition of the echoes. The composite pulses after passage through the filter $12^{tp}$ for compression are shown at (b). Here the pulses stand as clearly differentiated as if they had initially been transmitted in compressed condition.

Applicant's system has the further advantage of preserving "coherency" in the original pulse carrier. In the embodiment shown in FIG. 6 the carrier is the 10-megacycle carrier upon which the short duration pulse is modulated. If the usual care is exercised in filter adjustment, whether a single or double filter system is employed, the original carrier is preserved in the pulse after expansion, transmission and compression. Thus applicant's system may be used in systems where carrier frequency shifts between the transmitted pulse and received pulses are of importance, as well as in systems where the carrier phase relationships between the transmitted and received pulses are of importance. In such systems the pulse detector might take the form of a synchronous detector, supplied by the initial pulse carrier, instead of the simple detector proposed.

The invention provides a compression ratio in proportion to the square of the number of filter sections employed. If a seven-section filter is employed the compression ratio is 49 to 1 and a signal to noise improvement of 17 decibels is achieved. In a five-section filter the compression ratio is 25:1 and the signal to noise improvement 14 decibels. One can use a greater number of filter sections, if desired for greater bandwidths. The number of sections employed may be either odd or even.

While particular embodiments of the invention have been shown and described, it should be understood that the invention is not limited thereto and it is intended in the appended claims to claim all such variations as fall in the true spirit of the present invention.

What we claim as now and sought for protection by Letters Patent of the United States is:

1. A radar system comprising a source of short duration pulses of radiofrequency waves, a filter having a double input and single output, the transfer characteristic between the first of said inputs and said output being a first function of frequency and the transfer characteristic between the second input and said output being conjugate to said first transfer characteristic, means for coupling said source to said first input, a transmitter coupled to the output of said filter for amplifying the pulses transfered through said filter and transmitting the same, means for receiving echoes of said transmitted pulses, means for applying said received pulses to said second input terminal of said filter, and means coupled to said source and to the output of said filter for comparing the initial short pulses and the shortened received pulses.

2. A multiple stage pulse modifying filter having a double input and a single output, the respective paths between said respective inputs and said output having reciprocal transfer characteristics over a prescribed band of frequencies, each of said stages after the first having a time delay element connected in series with a band-pass filter, said first stage having a band-pass filter, the respective input and output terminals of each subsequent stage being coupled to the respective input and output terminals of the band-pass filter of the preceding stage, the widths of the passbands of said band-pass filters and the reciprocal of the time delays of said time delay elements all being equal to the same quantity for insuring an in phase addition of components lying at the edges of said passbands, the passbands of the band-pass filters in adjoining stages intersecting at the one-half gain point so as to provide continuous passage to waves lying between the frequency limits of said prescribed band, the first input and output terminal of said pulse modifying filter being respectively the input and output terminal of the band-pass filter in said first stage, the second input of said pulse modifying filter being the input terminal of the band-pass filter in the last stage.

3. A radar system comprising a source of short duration pulses of radiofrequency waves, a multiple stage pulse modifying filter having a time delay characteristic which is a function of frequency over a band of frequencies adequate to reproduce said short duration pulse, each of said stages after the first having a time delay element connected in series with a band-pass filter, said first stage having a band-pass filter, the respective input and output terminals of each subsequent stage being coupled to the respective input and output terminals of the band-pass filter of the preceding stage, means coupling said source to the input terminal of the first band-pass filter, a transmitter coupled to the output terminals of each stage of said pulse modifying filter for amplifying the pulses modified therein and transmitting the same, means for receiving echoes of said transmitted pulse, means for applying said received pulses to the input terminal of the last of the band-pass filters in said pulse modifying filter, and means coupled to the output terminals of each stage of said pulse modifying filter and to said source for comparing the shortened received pulses and the initial short duration pulses.